Feb. 6, 1934.   E. V. COLLINS   1,945,882
CULTIVATOR ATTACHMENT FOR TRACTORS
Filed Feb. 8, 1932   3 Sheets-Sheet 1
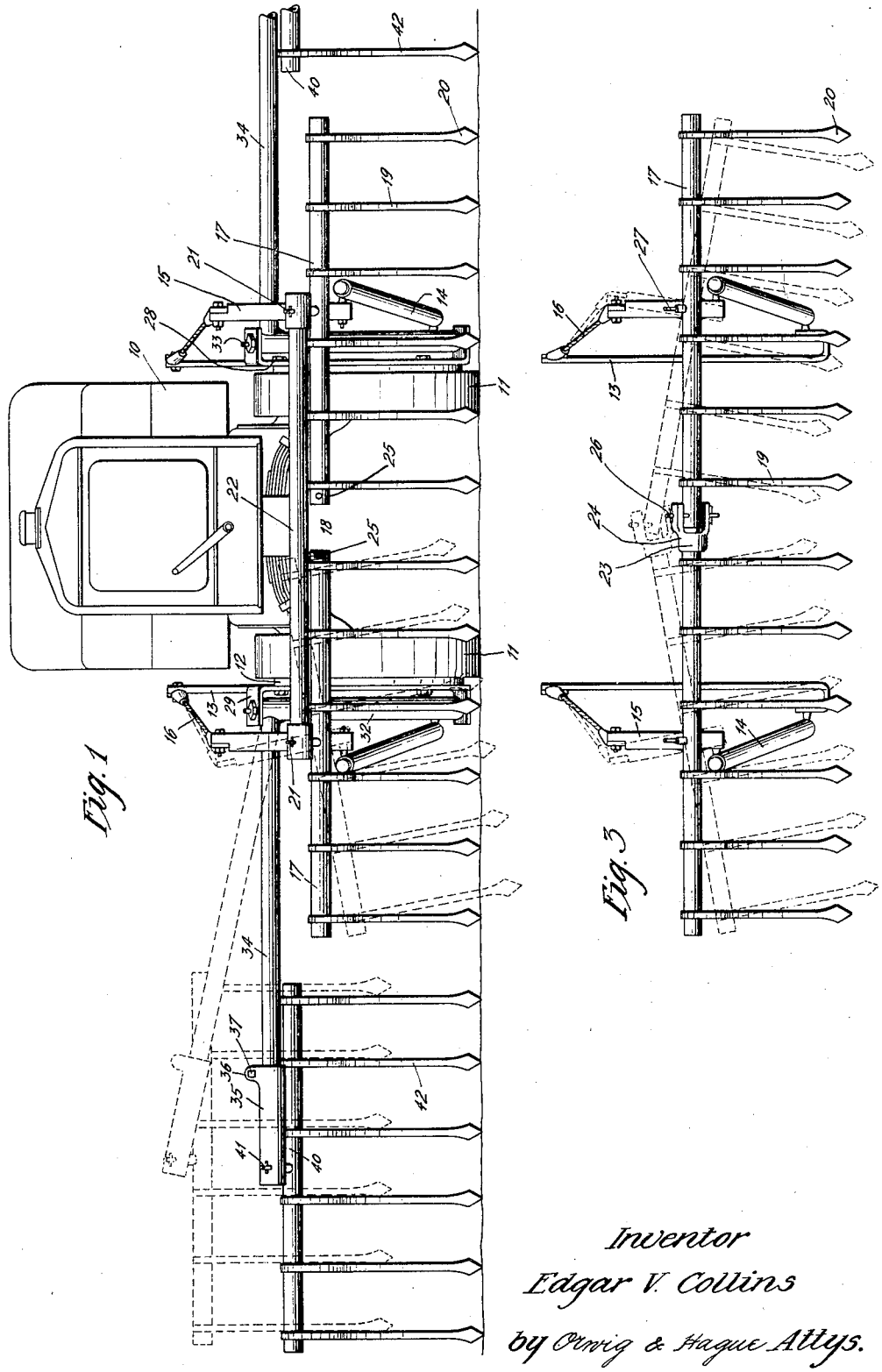
Inventor
Edgar V. Collins
by Orwig & Hague Attys.

Feb. 6, 1934.   E. V. COLLINS   1,945,882
CULTIVATOR ATTACHMENT FOR TRACTORS
Filed Feb. 8, 1932   3 Sheets-Sheet 2
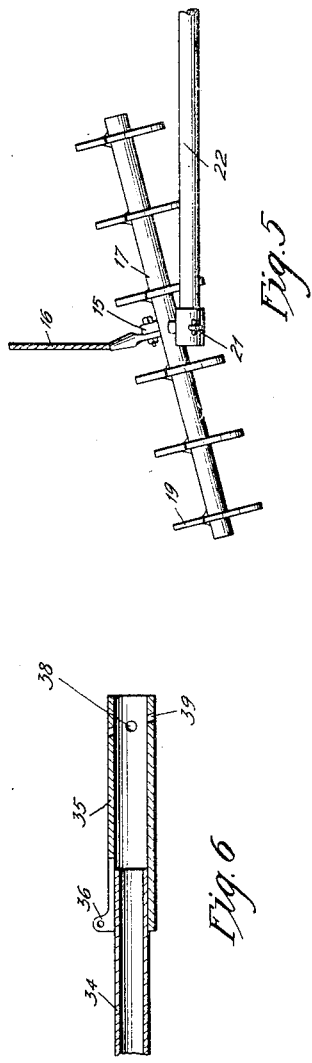
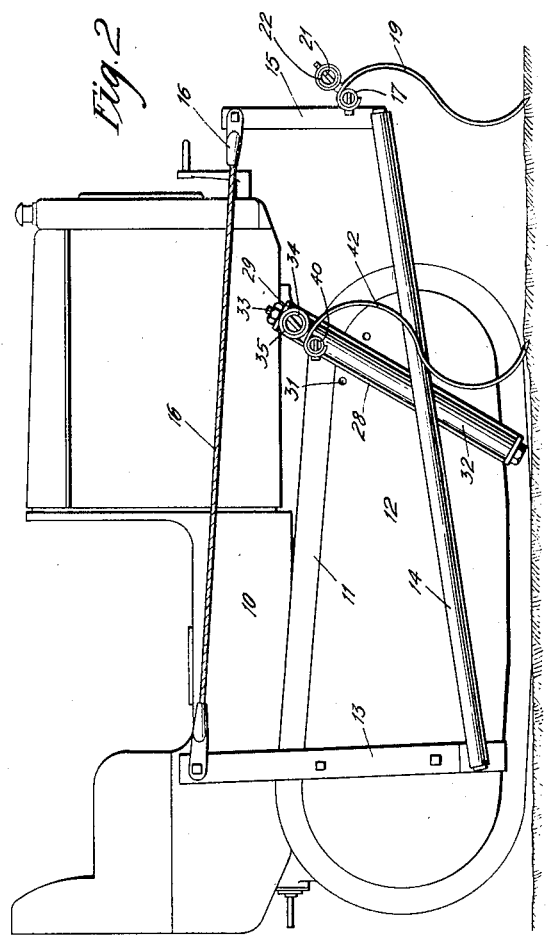
Inventor
Edgar V. Collins
by Orwig & Hague Attys.

Feb. 6, 1934.  E. V. COLLINS  1,945,882
CULTIVATOR ATTACHMENT FOR TRACTORS
Filed Feb. 8, 1932  3 Sheets-Sheet 3
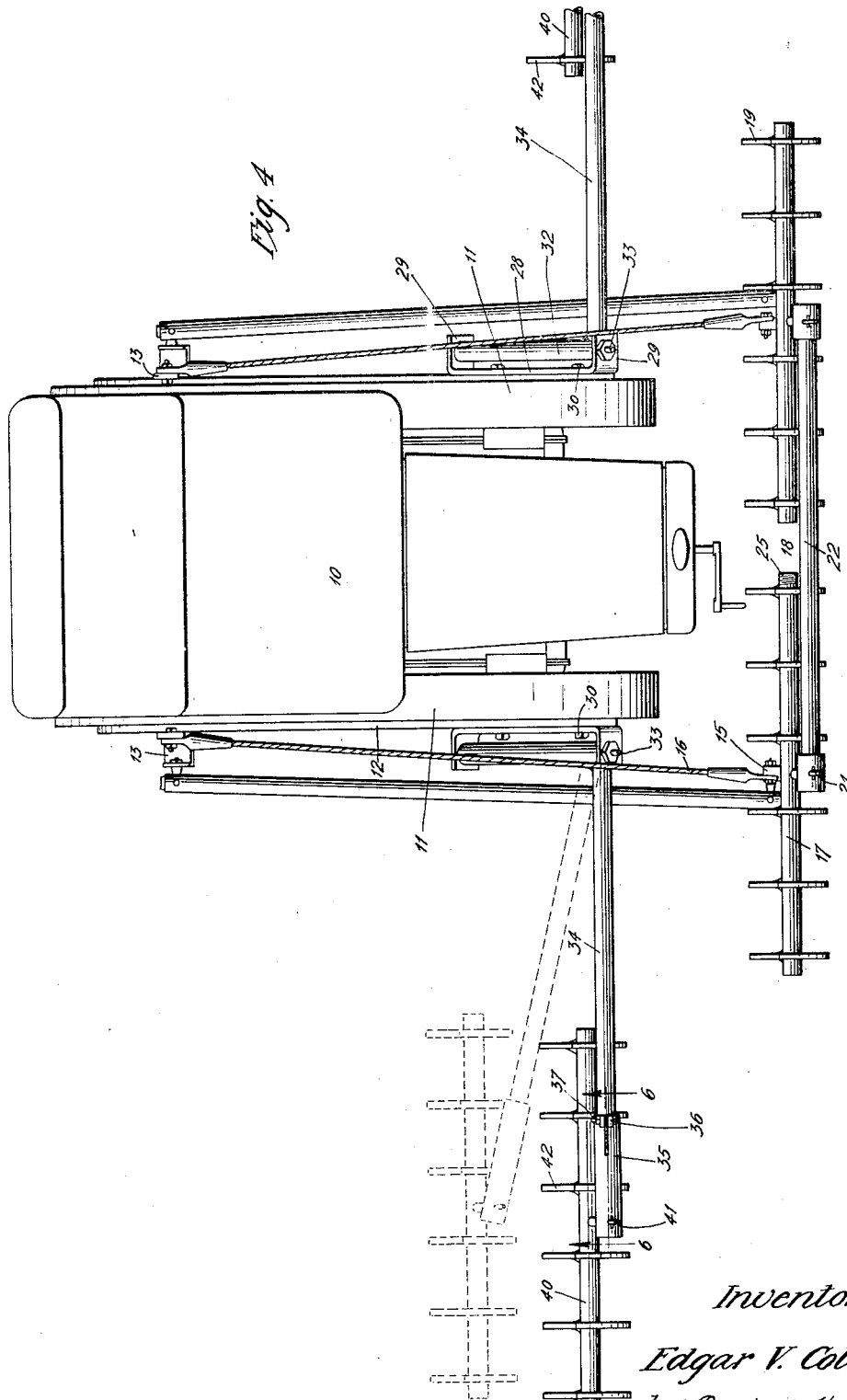
Inventor
Edgar V. Collins
by Orwig & Hague Attys Patented Feb. 6, 1934

1,945,882

UNITED STATES PATENT OFFICE 1,945,882

CULTIVATOR ATTACHMENT FOR TRACTORS

Edgar V. Collins, Ames, Iowa

Application February 8, 1932. Serial No. 591,575

10 Claims. (Cl. 97—47)

The object of my invention is to provide a cultivator attachment of simple, durable and inexpensive construction which may be easily and quickly applied to a vehicle such as an ordinary farm tractor, and particularly adapted when so applied to cultivate a number of rows of plants, and in which is employed improved mechanism for mounting the cultivator shanks so that the earth engaging tools carried by the shank will follow the contour of the ground surface in such a manner that the tools will operate at comparatively uniform depths.

More specifically it is the object of my invention to provide a series of shank supporting bars, each of which is independently supported in such a manner that the tools carried by the shanks of the bars will follow the contour of the ground surface to operate at a comparatively uniform depth, and at the same time maintain a comparatively constant cutting angle relative to the earth surface, even if the position of the cutting tools is above or below the operating surface of the tractor.

A further object is to provide a cultivator attachment which may be easily and quickly applied to the ordinary farm tractor and especially designed to be used in connection with shank bar supporting mechanism such as illustrated and described in my co-pending application filed February 16, 1931, Serial Number 516,027, my present invention disclosing improved means for connecting the shank bars carried in front of the tractor, whereby a greater flexibility may be imparted to said bars, and at the same time provide improved extension arms whereby other sets of shank bars may be operated in connection with the tractor, so that a greater number of rows of plants may be cultivated.

A further object is to provide a cultivator attachment comprising a substantially horizontal arm which is pivotally mounted to one side of the tractor in such a manner that the free end of the arm is free to swing upwardly and rearwardly, and in connection therewith means for pivoting the shank supporting bar to the free end of said arm in such a manner that the bar will adjust itself to uneven surfaces, and at the same time provide a yieldable pressure to the tools carried by the shank, and in connection with the pivotal connection between the arm and the shank supporting bar improved means for adjusting the distance of the shank bar from the tractor, and also the normal working angle of the shank bar.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a front view of my improved cultivator attachment as applied to a farm tractor.

Figure 2 is a side elevation of same.

Figure 3 is a front view of the front shank supporting bars showing the modified means for connecting the same to the tractor.

Figure 4 is a plan view of my improved cultivator as applied to a tractor, one of the laterally extending beams being broken away.

Figure 5 is a plan view of the outer end of one of the shank bar supporting beams showing the shank supporting bar slightly rotated relative to the beam when the beam is in the dotted line position shown in Figure 1.

Figure 6 is a detail sectional view taken on the line 6—6 of Figure 4.

Referring to the accompanying drawings I have used the reference numeral 10 to indicate a farm tractor, preferably of the type employing linked tread members, said members being indicated by the numeral 11. Said tread members are carried by a frame member 12. Secured to the rear end of the outer face of each of the members 12 is an upright bar 13, said bars being permanently fixed thereto.

Pivotally connected to the lower end of each of the bars 13 is a link 14 extending forwardly and having its forward end terminating slightly ahead of the front end of the tractor, as illustrated in Figure 2. Pivotally connected to the forward end of the link 14 is an upright bar 15, the upper end of which is connected to one end of a cable 16. The opposite end of said cable is pivotally connected to the upper end of the bar 13.

The members 15 are preferably shorter than the members 13, so that the upper and lower pivot members of the bars 15 operate in opposite directions in arcs inscribed by said pivot members as the bar 15 is elevated and lowered, whereby the bars 15 may be tilted forwardly or rearwardly as said movement takes place, to cause the tools, hereinafter described, to operate at a comparatively uniform depth in the manner illustrated in my said co-pending application.

Further description of the operation of this part of the device will be eliminated inasmuch as it forms no part of this present invention other than to provide yieldable supporting means for the shank bars hereinafter described.

The lower end of the forward edge of each of the bars 15 is provided with a substantially horizontal and transversely arranged shank bar 17. Said bars 17 are connected to the bars 15 at a point substantially midway between their ends.

Said bars 17 are of such length that when applied to a tractor, as illustrated in Figure 1, a space 18 will be provided between the adjacent ends of said bars. Each of the bars 17 has a series of downwardly extending cultivator shanks 19, the lower end of each shank having an earth engaging tool 20.

The central portion of each of the bars 17 is provided with an upwardly and forwardly extending pin or pivot member 21. Said members 21 are designed to support a link 22 which holds the bars 15 in properly spaced relation to each other, and at the same time provide bearings for the pins 21 to permit the bars 17 to swing in a plane perpendicular to the said pins 21, or in an upwardly and backwardly inclined plane in such a manner that if the teeth carried by the inner ends of the bars 17 engage an elevated portion of the earth surface, then the inner ends of said bars will be elevated in a manner illustrated by dotted lines in Figure 3.

These bars 17 also assume inclined positions relative to the longitudinal axis of the bar 22 in the manner illustrated in Figure 5, so that the teeth carried by the outer ends of the bars 17 will be in advance of the teeth carried by the inner ends of said bars.

In this connection it will be seen that the bars 15 will be tilted outwardly at their upper ends as clearly illustrated by dotted lines in Figure 3. The pivot connection between the bars 15 and the links 14 is such as to permit a limited universal movement.

By this arrangement it will be seen that the weight of the bars 17 and 22 and the links 15 will be carried by the teeth 20, so that the said bars 17 and 22 will be free to move upwardly and downwardly to follow the transversely arranged curvatures in the ground surface as compared with the advance of the tractor, while the pivot members 21 provide means for permitting the lower ends of the teeth 20 to adjust themselves to longitudinally extending uneven surfaces.

Inasmuch as the pivot members 21 are located midway between the ends of the bars 17, and each end of said bars 17 has the same number of cultivator tools, it will be seen that the natural tendency of the bars 17 is to assume a transversely arranged and alined position as the tractor is advanced, inasmuch as the resistance to the tools at each end of the bars is substantially equal. If, however, the tools at one end of one of the bars should engage an obstruction, such as a rock, then that end of the tool will swing rearwardly and also upwardly, causing the teeth to disengage the obstruction, after which the bars will automatically assume their normal transverse positions.

The bars 22 and 17 are steered transversely by mechanism not illustrated, but similar to the mechanism described in my said co-pending application.

Sometimes it is desirable to eliminate the bar 22, in which case the inner ends of the bars 17 are provided with a coupling device 23, comprising a head 24 having an internal screw threaded portion adapted to fit a screw threaded portion 25 on the inner end of one of the members 17. The inner end of the head 24 is bifurcated and provided with a pivot pin 26 designed to enter an opening 27 in the opposite member 17, in the manner clearly illustrated in Figure 3.

This last arrangement provides a somewhat less flexible mounting for the bars 17, and better adapted for work in which the ground surface is quite uneven or cloddy, while the arrangement shown in Figure 1 is better adapted when it is desired to get more flexibility in the movement of the bars 17.

By this arrangement it will be seen that the teeth 20 may be elevated and lowered a considerable distance without effecting the cutting inclination of the teeth to any appreciable extent, so that the suction of the teeth is substantially the same, regardless of their elevated or lowered position, due to the fact that the bars 15 are held substantially in a vertical position.

The mechanism above described is clearly adapted to cultivate about three rows of plants at a time. It is sometimes desirable to provide means for cultivating a greater number of rows of plants, inasmuch as the power of the tractor is sufficient to accomplish the additional work. The means by which this is accomplished is as follows:

Secured to the outer face of the front end of each of the members 12 is an upwardly and forwardly inclined bar 28. Each end of the bar has a laterally extending bracket portion 29. The angle of the member 28 is adjusted by means of bolts 30 and openings 31. Pivotally mounted in each of the brackets 28 is a tubular shaft 32 through which the bolt or pivot member 33 extends. The upper end of each of the shafts 32 is provided with a substantially horizontally and laterally extending beam 34.

The inner end of the beam 34 is rigidly connected to the shaft 32, so that the outer end of the beam 34 is free to swing in a plane perpendicular to the pivot members 33, or in a rearwardly and upwardly extending inclined plane.

The outer end of each of the beams 34 is provided with a sleeve 35 rotatively and slidably mounted thereon. The inner end of each of the sleeves is bifurcated and provided with lock lugs 36. A bolt 37 is provided for locking the sleeve to the beam. The outer end of each of the sleeves is provided with openings 38 drilled perpendicularly to the longitudinal axis of the sleeve. Said sleeve is also provided with openings 39 at right angles to the openings 38 and inclined relative to the longitudinal axis of said sleeve.

The outer end of each of the beams 34 is designed to be connected to a shank supporting bar 40 similar to the bars 17. Said bars 40 are pivotally connected to the outer end of the sleeves 35 by means of pivot members 41 rigidly fixed to said bars and designed to be rotatably mounted in either of the sets of openings 38 or 39. As illustrated in the drawings, the pins 40 are mounted in the openings 38.

The sleeve 35 is rotated on the beam 34 until the pivot member 40 is parallel with the corresponding pivot member 33 and moved longitudinally until the beams 40 are located at a proper distance from the longitudinal center of the tractor, after which the sleeve is locked in position by means of the bolt 37. Each of the bars 40 is provided with shanks or teeth 42.

By this arrangement it will be seen that the weight of the outer end of the beam 34 and the bars 40 will cause the same to move downwardly and forwardly until the tools on the lower ends of the teeth 42 engage the ground surface.

If the teeth engage transversely arranged uneven surfaces, the free end of the beam 34 will be swung forwardly or rearwardly, the free end being swung forwardly if the teeth engage downwardly extending inclined surfaces, and rearwardly if the teeth engage upwardly extending inclined surfaces, as the tractor is advanced, thereby causing the teeth to be elevated and lowered.

The bars 40 assume at all times transverse positions, as illustrated by dotted lines in Figure 4, as long as they engage transversely arranged horizontal surfaces. If, however, the teeth engage longitudinally extending inclined surfaces, then one end of the bar 40 will be elevated and the other lowered, in the manner before described in the operation of the bars 17.

Sometimes it is desirable to operate the bars 40 in such a manner that one end of said bar will be ahead of the other in the manner illustrated in Figure 5, under normal conditions when the teeth are engaging flat horizontal surfaces. This is accomplished by removing the pivot members 41 from the openings 28 and then rotating the sleeve 35 to an angle of 90° and placing said pins in the openings 39. By further rotating the sleeve 35 through an angle of 180° then the bars 40 may be made to assume a natural inclination in a direction opposite from the first said inclined position.

In all adjustments, however, the pins 41 should be supported in a common plane with the pivot members 33.

Thus it will be seen that I have provided a cultivator attachment for tractors of simple construction, which may be easily and quickly applied, and when so applied will provide tool supporting bars capable of flexible movement to permit the tools to always be operated in proper relation to the uneven ground surface, and to automatically adjust themselves to said operative positions, and to provide means whereby the teeth may be elevated and lowered, and at the same time maintain a substantially constant cutting angle with the ground surface, and in which the teeth may be made to follow either transversely or longitudinally extending hills or ditches in such a manner that a uniform cutting depth of the teeth may be constantly maintained.

The weight of the outer ends of the beams 34 and the bars 40 is sufficient to maintain the teeth at a proper depth.

It will readily be seen that although the drawings illustrate cultivator shanks applied to the shank supporting beams, various kinds of agricultural tools and cultivator tools of different shapes may be attached to the said shank bars without departing from the spirit of this invention:

I claim as my invention:

1. A cultivator comprising a movable supporting frame, a pair of horizontally arranged and alined shank supporting bars arranged transversely of the movement of said support, a series of cultivator shanks fixed to and depending from each bar, a vertically arranged rock arm on each bar, a pair of rearwardly extending links pivoted to each rock arm having their rear ends pivoted near the rear end of said movable support, an upwardly and forwardly extending pivot member carried by the central portion of each bar, and a connecting bar having its ends supported by the last pivot members.

2. A cultivator comprising a movable supporting frame, a pair of horizontally arranged and alined shank supporting bars arranged transversely of the movement of said supporting frame, a series of cultivator shanks fixed to and depending from each bar, a vertically arranged rock arm on each bar, a pair of rearwardly extending links pivoted to each rock arm having their rear ends pivoted to said movable frame, and means for pivotally connecting the adjacent ends of said shank supporting bars together.

3. A cultivator comprising a movable supporting frame, a pair of horizontally arranged and alined shank supporting bars arranged transversely of the movement of said support, a series of cultivator shanks fixed to and depending from each bar, a vertically arranged rock arm on each bar, a pair of rearwardly extending links pivoted to each rock arm having their rear ends pivoted near the rear end of said movable support, an upwardly and forwardly extending pivot member carried by the central portion of each bar, a connecting bar having its ends supported by the last pivot members, a beam supported transversely from each side of said supporting frame, the inner end of each beam being supported by an upwardly and forwardly inclined pivot member to permit the free ends of said beams to swing in an upwardly and rearwardly inclined plane, a shank supporting bar carried by the free end of each beam, and means for pivotally connecting the central portion of each shank supporting bar to the free end of said beam, the axis of said pivot member being in a plane common to the axis of the pivot member of said bar.

4. A cultivator comprising a movable supporting frame, a pair of horizontally arranged and alined shank supporting bars arranged transversely of the movement of said supporting frame, a series of cultivator shanks fixed to and depending from each other, a vertically arranged rock arm on each bar, a pair of rearwardly extending links pivoted to each rock arm having their rear ends pivoted to said movable frame, means for pivotally connecting the adjacent ends of said shank supporting bars together, a beam supported transversely from each side of said supporting frame, the inner end of each beam being supported by an upwardly and forwardly inclined pivot member to permit the free ends of said beams to swing in an upwardly and rearwardly inclined plane, a shank supporting bar carried by the free end of each beam, and means for pivotally connecting the central portion of each shank supporting bar to the free end of said beam, the axis of said pivot member being in a plane common to the axis of the pivot member of said bar.

5. A cultivator comprising in combination a movable supporting frame, a transversely arranged beam, means for pivoting one end of said beam to permit its free end to swing in an upwardly and rearwardly inclined plane, a shank supporting bar having its central portion pivoted to the free end of said beam, the axis of said pivot being substantially parallel with the axis of the first pivot, and agricultural tools carried by said shank supporting bar.

6. An attachment for vehicles comprising a substantially horizontal and transversely arranged beam, a horizontally and transversely arranged shank supporting bar, means for pivoting one end of said beam to said vehicle to cause its free end to swing in a rearwardly and upwardly inclined plane, means for pivoting the central portion of the bar to the free end of said beam about an axis substantially parallel with the axis of the first pivot member to permit the bar to assume various angular positions relative to said beam and to swing in a plane parallel with the first said plane, and agricultural tools carried by said bar.

7. A cultivator attachment for vehicles comprising a substantially horizontal beam, means for pivotally connecting one end of said beam to said vehicle to permit its free end to swing in an upwardly and rearwardly inclined plane, a sleeve rotatively and slidably mounted on the free end of said beam, means for locking said sleeve thereto, a shank supporting bar, and means for pivotally connecting said shank supporting bar to the free end of said beam, said means including means for adjusting the angle of said pivot relative to said beam.

8. A cultivator attachment for vehicles comprising a substantially horizontally and transversely arranged tool supporting bar, a support designed to be carried by a vehicle and mounted for up and down movement, means pivoting said bar at its central portion to said support, and agricultural tools carried by said bar.

9. A cultivator comprising in combination a movable supporting frame, a transversely arranged beam, means for pivoting one end of said beam to permit its free end to swing in an upwardly and rearwardly inclined plane, a shank supporting bar having its central portion pivoted to the free end of said beam, and agricultural tools carried by said shank supporting bar.

10. A cultivator comprising in combination a movable supporting means, a transversely arranged shank supporting bar, said bar having a central pivot, and means carried by said movable support for guiding the pivot of said shank supporting bar to permit said bar to reciprocate in an upwardly and forwardly inclined plane.

EDGAR V. COLLINS.